3,414,620
MULTIFUNCTIONAL AMINE COMPOUNDS AND
METHODS FOR THEIR PREPARATION
Clarence R. Bresson and Raymond L. Cobb, Bartlesville,
Okla., assignors to Phillips Petroleum Company, a corporation of Delaware
No Drawing. Filed Oct. 4, 1965, Ser. No. 492,876
14 Claims. (Cl. 260—584)

ABSTRACT OF THE DISCLOSURE

A method of preparing mercapto-substituted amines which comprises reacting an oxazoline compound with an organic thiol compound to form a reaction mixture, hydrolyzing the reaction product, with a mineral acid, and recovering the mercapto-substituted amines. In addition, the oxazoline-organic thiol reaction mixture can be treated with a thioic acid prior to hydrolysis to yield the mercapto-substituted amines.

This invention relates to novel compounds. In one aspect this invention relates to multifunctional substituted amines. In another aspect, this invention relates to novel mercapto-substituted and hydrocarbylthioethyl-substituted hydroxy amines. In yet another aspect, this invention relates to a method for preparing these novel compounds.

One object of this invention is to provide novel multifunctional amines which are useful as antiradiation drugs, flotation agents and bactericides.

Another object of this invention is to provide a method for synthesizing these novel compounds.

Other objects and advantages will be apparent from the following description of the invention, and the novel features will be particularly pointed out hereinafter in connection with the appended claims. The novel compounds of the present invention are prepared by a process comprising a series of steps in which the first step is illustrated by the following equation:

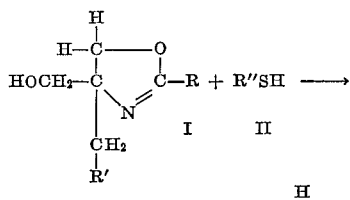

wherein R and R″ are selected from the group consisting of alkyl, aryl, and cycloalkyl radicals and combinations thereof such as alkaryl radicals, aralkyl radicals, and the like, containing from 1–12 carbon atoms, and R′ is selected from the group consisting of R, hydrogen, hydroxy, and alkoxy radicals containing from 1–12 carbon atoms. When R′ in Formula I is hydroxy, this hydroxy group is replaced to some extent by R″S groups, the replacement being quite substantial when more than approximately two moles of mercaptan (Formula II) per mole of oxazoline compound (Formula I) is used, resulting in the formation of compounds having the formulas

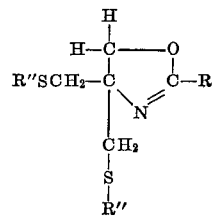

and

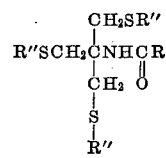

This reaction of the oxazoline compound (Formula I) with the mercaptan (Formula II) is effected in the absence of a solvent at a temperature generally ranging from 150–300° C. for a period of time generally ranging from a few minutes to several days, preferably less than 24 hours. The mol ratio of mercaptan to oxazoline compound depends upon the number of hydroxyl groups present in the oxazoline compound and on the desired degree of substitution of R″S groups. This mol ratio will range from 1/1 to 3/1 mercaptan/oxazoline compound.

Representative examples of oxazoline compounds having Formula I which can be employed in the process of this invention are as follows:

2-methyl-4,4-bis(hydroxymethyl)oxazoline
2-ethyl-4-methyl-4-hydroxymethyloxazoline
2-n-propyl-4-methoxymethyl-4-hydroxymethyloxazoline
2-phenyl-4-isooctyl-4-hydroxymethyloxazoline
2-n-dodecyl-4-n-hexyl-4-hydroxymethyloxazoline
2-cyclohexyl-4-tridecyl-4-hydroxymethyloxazoline
2-naphthyl-4-n-dodecoxymethyl-4-hydroxmethyloxazoline
2-p-tolyl-4-benzyl-4-hydroxymethyloxazoline
2-(6-n-hexylphenyl)-4-(2-n-butylbenzyl)-4-
  hydroxymethyloxazoline
2-benzyl-4-cyclopentylmethyl-4-hydroxymethyloxazoline
2-(3-methylhexyl)-4-(2-phenylethyl)-4-hydroxymethyl-
  oxazoline Examples of mercaptans having Formula II are as follows: methyl mercaptan, ethyl mercaptan, tert-butyl mercaptan, n-hexylmercaptan, isooctyl mercaptan, n-dodecylmercaptan, thiophenol, thio-β-naphthol, benzyl mercaptan, 4-phenylbutyl mercaptan, 3-phenylhexyl mercaptan, p-tolyl mercaptan, 4-n-hexylphenyl mercaptan, cyclohexyl mercaptan, cyclooctyl mercaptan, cyclododecyl mercaptan, 4-n-butylcyclohexyl mercaptan, 2-cyclohexylethyl mercaptan and the like.

The compounds represents by Formula III are converted to compounds of Formula VIII by reaction with thio acids having the formula:

wherein R‴ is the same as R defined hereinabove. This reaction can be expressed as follows:

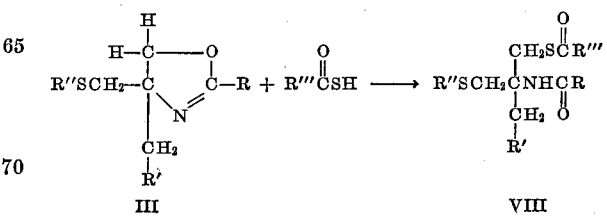

The reaction of the compounds of Formula III with a thio acid is carried out in the presence of a diluent the choice of which is fairly narrow. Suitable diluents include heterocyclic nitrogen compounds and alkanenitriles including such specific compounds as pyridine, pyrazine, pyrimidine, pyridazine, quinoline, 2-methyl-5-ethylpyridine, acetonitrile, propionitrile, butyronitrile and the like.

The mol ratio of thio acid to the Formula III compounds is in a range from at least 1/1 to 1.5/1 and the reaction is generally effected at a temperature ranging from 0 to 100° C. for a period of time ranging from a few minutes to several days, preferably less than 24 hours.

The compounds of Formulas IV, VI and VIII can be hydrolyzed to remove the

and/or

groups and replace them with hydrogen. This hydrolysis step can be carried out by contacting Formulas IV, VI and VIII compounds with a mineral acid which is one selected from the group consisting of sulfuric acid, hydrochloric acid and phosphoric acid. The reaction is carried out at a temperature ranging from 25 to 150° C. for a period of time ranging from a few minutes to several days, usually from 0.5 to 24 hours. The amount of acid should be sufficient to hydrolyze the hydrolyzable groups present and to neutralize the amine group present to form salts of the novel compounds of this invention having the formulas:

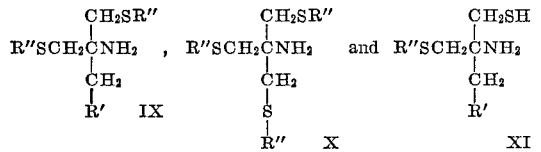

Examples of compounds of Formula IX which can be prepared by the process of this invention are as follows:

1,1-bis(methylthiomethyl)ethylamine
1,1-bis[(2,6-di-tert-butylphenyl)thiomethyl]-n-tetradecylamine
2-ethoxy-1,1-bis(cyclohexylthiomethyl)ethylamine
3-phenyl-1,1-bis[(2-ethylhexyl)thiomethyl]propylamine
1,1-bis(ethylthiomethyl)-n-dodecylamine
2-α-naphthyl-1,1-bis(benzylthiomethyl)ethylamine The above typical compounds are also prepared in the mercaptomethyl-substituted form as described below.

Examples of compounds of Formula XI which can be prepared by the process of this invention are as follows:

2-amino-2-methylthiomethyl-1-propanethiol
2-amino-2-(n-dodecylthiomethyl)-4,6-diethyl-1-decanethiol
2-amino-2-cyclopentylthiomethyl-3-sec-butoxy-1-propanethiol
2-amino-2-benzylthiomethyl-5-ethyl-1-nonanethiol
2-amino-2-sec-propylthiomethyl-3-methoxy-1-propanethiol The hydrocarbylthiomethyl - substituted compounds shown above can also be prepared in the corresponding mercaptomethyl-substituted form described below.

Examples of compounds of Formula X which can be prepared by the process of this invention are as follows:

1,1,1-tris(methylthiomethyl)methylamine
1,1,1-tris(n-dodecylthiomethyl)methylamine
1,1,1-tris(phenylthiomethyl)methylamine
1,1,1-tris(cyclohexylthiomethyl)methylamine
1,1,1-tris(benzylthiomethyl)methylamine
1,1,1-tris-[(2,4,6-trimethylphenyl)thiomethyl]methylamine
1,1,1-tris[(3-cyclopentyl-n-butyl)thiomethyl]methylamine One or more of the hydrocarbylthiomethyl groups in the examples above can also be replaced by mercaptomethyl groups as described below, provided the hydrocarbylthiomethyl group(s) are arylmethylthio or alkarylmethylthio group(s) to give compounds having the Formulas XII and XIII.

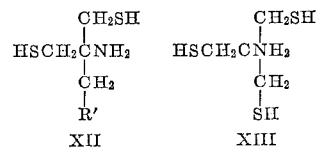

The compound represented by Formula XIII is 1,1,1-tris(mercaptomethyl)methylamine. Examples of compounds represented by Formula XII which can be prepared by the process of this invention are as follows:

1,1-bis(mercaptomethyl)ethylamine
1,1-bis(mercaptomethyl)propylamine
1,1-bis(mercaptomethyl)-3-methylhexylamine
1,1-bis(mercaptomethyl)-n-tetradecylamine
2-hydroxy-1,1-bis(mercaptomethyl)ethylamine
2-methoxy-1,1-bis(mercaptomethyl)ethylamine
2-phenyl-1,1-bis(mercaptomethyl)ethylamine
2-p-tolyl-1,1-bis(mercaptomethyl)ethylamine
3-phenyl-1,1-bis(mercaptomethyl)propylamine
2-cyclohexyl-1,1-bis(mercaptomethyl)ethylamine In the embodiment calling for mercapto-substituted amines, the R″ group attached to a sulfur atom is arylmethyl, such as benzyl, or alkarylmethyl, whereupon the arylmethyl or alkarylmethyl radical is replaced with a hydrogen atom by cleavage with an alkali metal in conjunction with ammonia or a suitable primary or secondary amine. The cleavage reaction is carried out at a temperature generally ranging from −50 to +50° C. depending upon the particular amine employed. When ammonia is used, it is preferred to operate below 0° C. Cosolvents or diluents of an ethereal type such as tetrahydrofuran, p-dioxane and the like can be employed. The amount of alkali metal should be at least stoichiometric with the active groups present as the alkali metal will also react with hydroxy groups.

It is to be understood that the products of Formulas IX, X, and XI can be formed and used either as their free bases or as their salts, including the salts formed from organic and inorganic acids.

It is to be understood that these compounds can be prepared in a continuous medium in the solvents disclosed hereinabove and can be recovered by conventional methods, such as crystallization, distillation, solvent extration, and the like. These recovery operations are conventional steps and are familiar to those skilled in the art. The technique for the recovery of specific compounds can vary somewhat due to differences in molecular weight, solubility, boiling point and the like.

The following specific example shows detailed experimental work on the preparation of products of this invention, but it is not intended that the invention be limited to the specific features of this example.

EXAMPLE

A series of runs was carried out according to the process of this invention by which 2-hydroxy-1,1-bis(mercaptomethyl)ethylamine hydrochloride was prepared.

In the first step, 4,4-bis(hydroxymethyl)-2-methyl-2-oxazoline was prepared in the following manner. In this step, 726 grams (6.0 mol) of 2-amino-2-hydroxymethyl-1,3-propanediol, 1700 ml. of xylene and 360 grams (6.0 mols) of glacial acetic acid were heated at reflux temperature (130–140° C.) until the theoretical amount of water (216 ml., 12 mols) was removed. This required about 6 hours. At this time, 1100 ml. of xylene was removed by distillation, and after cooling the mixture to 100° C., 1500 ml. of acetonitrile was added. After cooling to 20° C., 4,4-bis(hydroxymethyl)-2-methyl-2-oxazoline crystallized. (Approximately 90% yield.)

This material was then converted to 4-benzylthiomethyl-4-hydroxymethyl-methyl-2-oxazoline in the following manner. A solution of 107 grams (0.735 mol) of 4,4-bis-(hydroxymethyl)-2-methyl-2-oxazoline and 91.5 grams (0.735 mol) of benzyl mercaptan was heated at 155° C. for 16 hours under an inert atmosphere. The resulting mixture was then fractionally distilled at reduced pressure through a 45 cm. Vigreaux column.

The fraction boiling at 186.5° C. at 0.35 mm. absolute pressure, and amounting to 64 grams, solidified on cooling, and was recrystallized from toluene to yield 39.8 grams (22% yield) of a product having a melting point of 92–93° C. This material was identified as 4-benzylthiomethyl-4-hydroxymethyl-2-methyl-2-oxazoline by the following elemental analysis:

ELEMENTAL ANALYSIS

| Element | Calculated for $C_{13}H_{17}NO_2S$, wt. percent | Found, Wt. percent |
|---|---|---|
| Carbon | 62.12 | 62.0 |
| Hydrogen | 6.82 | 6.7 |
| Nitrogen | 5.57 | 5.5 |
| Sulfur | 12.76 | 12.5 |

The above prepared material was then converted to 2-actaamido - 2 - benzylthiomethyl - 2 - hydroxymethylethyl thiolbenzoate in the following manner. A solution of 25.1 grams (0.1 mole) of 2-methyl-4-benzylthiomethyl-4-hydroxymethyl-2-oxazoline, 50 ml. of acetonitrile and 14.5 grams (0.1 mol) of 95 percent thiolbenzoic acid was stirred in an inert atmosphere at 20–25° C. for 3 hours, after which the reaction mixture was heated to 60° C. After cooling to room temperature, the solution was poured into 600 ml. of ice and water to yield an oil which crystallized on prolonged stirring. The product was filtered, washed, and dried to give 93 percent yield (36.3 grams) of a material having a melting point of 98–99° C. This material was identified as 2-acetamido-2-benzylthiomethyl-2-hydroxymethylethyl thiolbenzoate by the following elemental analysis:

ELEMENTAL ANALYSIS

| Element | Calculated for $C_{20}H_{23}NO_3S_2$, wt. percent | Found, wt. percent |
|---|---|---|
| Carbon | 61.67 | 61.95 |
| Hydrogen | 5.93 | 6.05 |
| Nitrogen | 3.60 | 3.45 |
| Sulfur | 16.46 | 16.0 |

The above prepared material was then converted to 2-amino - 2 - benzylthiomethyl-3-mercaptopropanol hydrochloride by the following hydrolysis procedure. In this step, a mixture of 33 grams (0.85 mol) of 2-acetamido-2-benzylthiomethyl-2-hydroxymethyl thiolbenzoate, 100 ml. of concentrated hydrochloric acid, and 25 ml. of water was heated to reflux for 16 hours. The benzoic acid formed was removed by filtration after cooling, and the resulting filtrate was stripped under vacuum. The residue was dried under vacuum at 67° C. for 24 hours to yield the theoretical weight of the desired product as an oil. This material was identified as the desired product, 2-amino - 2 - benzylthiomethyl-3-mercaptopropanol hydrochloride, by the following elemental analysis:

ELEMENTAL ANALYSIS

| Element | Calculated for $C_{11}H_{17}NOS_2 \cdot HCl$, wt. percent | Found, wt. percent |
|---|---|---|
| Carbon | 47.21 | 49.6 |
| Hydrogen | 6.48 | 6.9 |
| Nitrogen | 5.01 | 3.85 |
| Total sulfur | 22.92 | 17.7 |
| Mercaptan sulfur | 11.5 | 6.8 |

The above prepared material was converted to 2-hydroxy-1,1-bis(mercaptomethyl)ethylamine hydrochloride by debenzylation in the following manner. Twenty-five grams of 2 - amino - 2 - benzylthiomethyl-3-mercaptopropanol hydrochloride was cleaved with sodium in a mixture of tetrahydrofuran and liquid ammonia to yield 3.7 (21.8% yield) grams of a material having a melting point of 120–125° C. This material was identified as 2-hydroxy-1,1-bis(mercaptomethyl)ethylamine hydrochloride by the following elemental analysis:

ELEMENTAL ANALYSIS

| Element | Calculated for $C_4H_{11}NOS_2 \cdot HCl$, wt. percent | Found, wt. percent |
|---|---|---|
| Carbon | 25.32 | 27.5 |
| Hydrogen | 6.38 | 6.7 |
| Nitrogen | 7.38 | 7.3 |
| Mercaptan sulfur | 33.8 | 29.8 |

Obviously, many modifications and variations of the present invention are possible in the light of the above teachings. It is therefore to be understood that within the scope of the appending claims the invention may be practiced otherwise than as specifically described herein.

We claim:
1. 1,1,1-tris(methylthiomethyl)methylamine.
2. 2-amino-2-methylthiomethyl-1-propanethiol.
3. 1,1-bis(methylthiomethyl)ethylamine.
4. 2 - hydroxy-1,1-bis(mercaptomethyl)ethylamine hydrochloride.
5. 1,1,1-tris(mercaptomethyl)methylamine.
6. 2-amino-2-benzylthiomethyl-3-mercaptopropanol.
7. A method for synthesizing compounds having the formulas

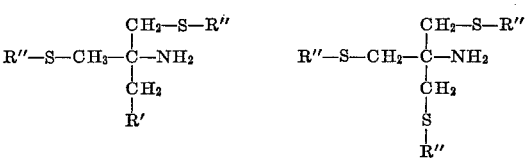

wherein R' is selected from the group consisting of R, hydrogen, hydroxy, and alkoxy, containing from 1–12 carbon atoms, R and R" are selected from the group consisting of alkyl, aryl, cycloalkyl, and combinations thereof having from 1–12 carbon atoms, said method comprising the steps of reacting an oxazoline having the formula

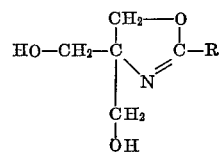

hydrolyzing the reaction mixture with a mineral acid, and recovering the compounds having the formulas defined hereinabove.

8. A process according to claim 7 wherein the oxazoline is reacted with R"SH in a mol ratio of from 1/1 to 3/1 of R"SH to said oxazoline at a temperature range of from 150° to 300° C.

9. A method for synthesizing compounds having the formulas

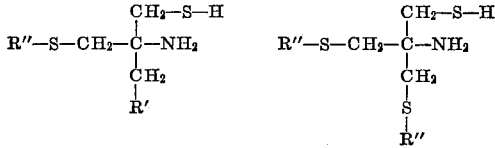

wherein R' is selected from the group consisting of R, hydrogen, hydroxy, and alkoxy, containing from 1–12 carbon atoms, R and R" are selected from the group consisting of alkyl, aryl, cycloalkyl, and combinations thereof having from 1–12 carbon atoms, said method comprising the steps of reacting an oxazoline having the formula

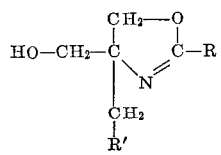

wherein R is the same as R″ with R″SH in a mol ratio of from 1/1 to 3/1 of R″SH to said oxazoline in a temperature range of 150–300° C.; treating the reaction mixture with

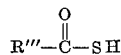

in the presence of a diluent; hydrolyzing the treated reaction mixture with a mineral acid selected from the group consising of sulfuric, hydrochloric and phosphoric acids and recovering the compounds having the formulas defined hereinabove and wherein R‴ is the same as R.

10. A process according to claim 9 wherein the diluent is selected from the group consisting of pyridine, pyrazine, pyrimidine, pyridazine, quinoline, 2-methyl-5-ethylpyridine, acetonitrile, propionitrile and butyronitrile.

11. A method for synthesizing compounds having the formula

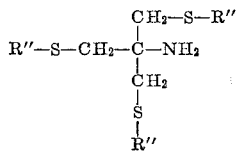

wherein R″ is selected from the group consisting of alkyl, aryl, cycloalkyl, and combinations thereof having from 1–12 carbon atoms, said method comprising the steps of reacting an oxazoline having the formula

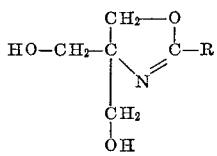

wherein R is the same as R″ with 3 mols of R″SH per mol of oxazoline; hydrolyzing the reaction mixture with hydrochloric acid and recovering the compound of the formula defined hereinabove.

12. A method for synthesizing 2-hydroxy-1,1-bis(mercaptomethyl)ethylamine hydrochloride, said method comprising the steps of reacting 4,4-bis(hydroxymethyl)-2-methyl-2-oxazoline with benzyl mercaptan; treating the reaction mixture with thiolbenzoic acid in the presence of acetonitrile; hydrolyzing the treated reaction mixture with hydrochloric acid; debenzylating the hydrolyzed product to form 2 - hydroxy-1,1-bis(mercaptomethyl)ethylamine hydrochloride.

13. A method for synthesizing compounds having the formula

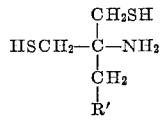

wherein R′ is selected from the group consisting of R, hydrogen, hydroxy, and alkoxy, containing from 1–12 carbon atoms, R is selected from the group consisting of alkyl, aryl, cycloalkyl, and combinations thereof having from 1–12 carbon atoms, said method comprising the steps of reacting an oxazoline having the formula

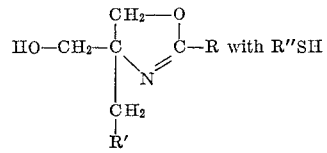

wherein R″ is arylmethyl or alkarylmethyl radicals; hydrolyzing the reaction mixture with a mineral acid; and dearylmethylating or dealkarylmethylating the hydrolyzed product to form compounds having the formula characterized hereinabove.

14. A process according to claim 13 wherein the oxazoline is reacted with R″SH in a mol ratio of from 1/1 to 3/1 of R″SH to said oxazoline at a temperature range of from 150° to 300° C., and the dearylmethylating or dealkarylmethylating of the hydrolyzed product is accomplished by reacting said product with an alkali metal in conjunction with ammonia or a primary or secondary amine at a temperature in the range of from −50° to +50° C.

References Cited

UNITED STATES PATENTS 3,318,953  5/1967  Wehrmeister.

CHARLES B. PARKER, *Primary Examiner.*

R. L. RAYMOND, *Assistant Examiner.*

UNITED STATES PATENT OFFICE
CERTIFICATE OF CORRECTION

Patent No. 3,414,620                                                   December 3, 1968

Clarence R. Bresson et al.

It is certified that error appears in the above identified patent and that said Letters Patent are hereby corrected as shown below:

Column 6, lines 34 to 39, the left-hand formula should appear as shown belc

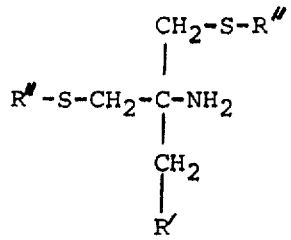

same column 6, lines 47 to 54, the formula should appear as shown below:

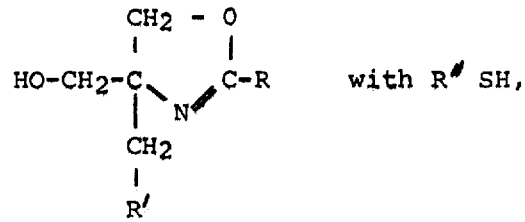

Column 7, line 19, "consising" should read -- consisting --.

Signed and sealed this 24th day of March 1970, (SEAL)
Attest:

EDWARD M. FLETCHER, JR.                                      WILLIAM E. SCHUYLER, JR
Attesting Officer                                                  Commissioner of Patents